United States Patent
Ingleby

(10) Patent No.: US 12,407,697 B2
(45) Date of Patent: Sep. 2, 2025

(54) NETWORK ACCESS CONTROL FROM ANYWHERE

(71) Applicant: FORESCOUT TECHNOLOGIES, INC., San Jose, CA (US)

(72) Inventor: Erick Ingleby, San Francisco, CA (US)

(73) Assignee: Forescout Technologies, Inc., San Jose, CA (US)

( * ) Notice: Subject to any disclaimer, the term of this patent is extended or adjusted under 35 U.S.C. 154(b) by 264 days.

(21) Appl. No.: 18/148,959

(22) Filed: Dec. 30, 2022

(65) Prior Publication Data

US 2023/0319075 A1    Oct. 5, 2023

Related U.S. Application Data

(60) Provisional application No. 63/325,297, filed on Mar. 30, 2022.

(51) Int. Cl.
    *H04L 9/40*    (2022.01)
(52) U.S. Cl.
    CPC .............. *H04L 63/1416* (2013.01)

(58) Field of Classification Search
    CPC .................................. H04L 63/1416
    USPC ......................................... 726/23
    See application file for complete search history.

(56) References Cited

U.S. PATENT DOCUMENTS

| 11,552,954 B2* | 1/2023 | Zou ............... H04L 63/0263 |
| 2019/0014086 A1* | 1/2019 | Meyer ............ H04L 63/0236 |
| 2022/0321590 A1* | 10/2022 | Sharma .............. H04L 63/20 |

* cited by examiner

*Primary Examiner* — Anthony D Brown
(74) *Attorney, Agent, or Firm* — Womble Bond Dickinson (US) LLP

(57) ABSTRACT

Systems, methods, and related technologies for managing network access control from anywhere are described. A method includes receiving, from a cloud-based security system, information about a device that is coupled to a public network and decoupled from a private network. Based on the information, the method detects risky activity associated with the device. The method sends instructions to a remote agent executing on the device to perform one or more security measures that protect a resource of the device.

17 Claims, 7 Drawing Sheets

NETWORK ACCESS CONTROL FROM ANYWHERE

CROSS-REFERENCE TO RELATED APPLICATIONS

This application claims priority from and the benefit of U.S. Provisional Patent Application No. 63/325,297 filed Mar. 30, 2022, the entire contents of which are incorporated herein by reference.

TECHNICAL FIELD

The present disclosure relates to network monitoring, and more particularly, to performing network access control actions on assets that are outside of a private network.

BACKGROUND

A computer network can include computing devices that communicate with each over a computer network. The computing devices can be communicatively coupled to each other over physically wired, optical, or wireless radio-frequency technology. A computer network can have a variety of network topologies with a variety of devices in different regions of the network. As technology advances, the number and variety of devices that communicate over computer networks are rapidly increasing.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
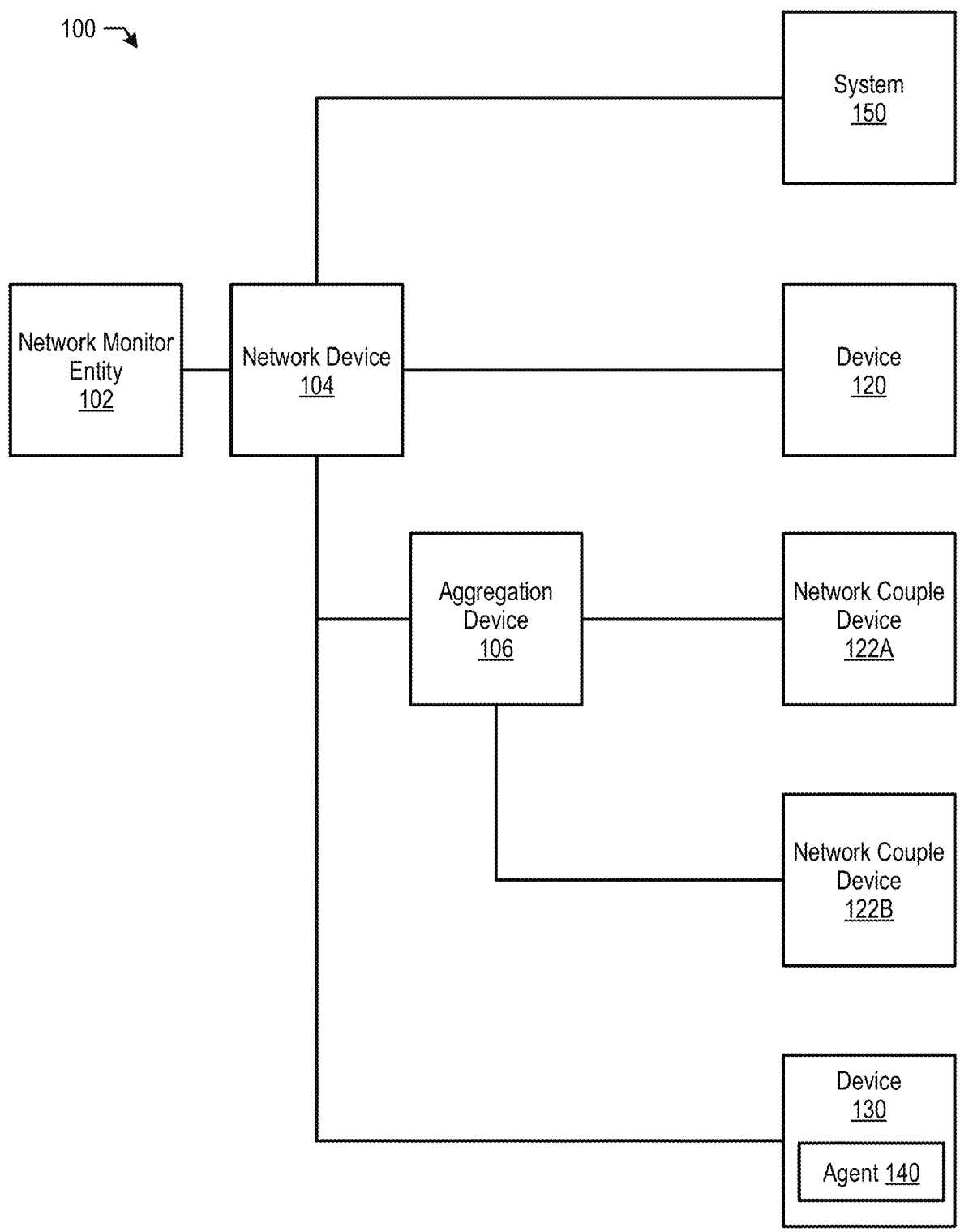
FIG. 1 depicts an illustrative communication network, in accordance with some embodiments of the present disclosure.

In conventional systems, Network Access Control (NAC) visibility and control is limited to when a device resides on a private network (e.g., corporate network) such as a data center or cloud. For example, if a user is using a corporate laptop on a plane coupled to a public network via an on-board Wi-Fi signal, a conventional NAC system has no visibility of activity being performed at the laptop and limited control of remediating issues on the laptop. While conventional NAC systems may be able to restrict access to resources once a device enters the private network, resources on the device could be compromised while the device is decoupled from the private network.

Accordingly, the present disclosure addresses the above-noted and other deficiencies by using a cloud-based security system to detect malicious activity on a remote device and performing security measures on the remote device accordingly. When the information indicates malicious activity at the device, instructions are sent to a remote agent executing on the device to perform security measures to protect a resource installed on the device from being compromised. In turn, the approach provides an NAC system with visibility and control over devices that are decoupled from a private network, thereby protecting sensitive resources installed on the device.

An entity or entities, for example, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the device, a device may have an IP (Internet Protocol) address (e.g., a device) or may be without an IP address (e.g., a serverless service). Embodiments are able to dynamically (e.g., on the fly or responsive to changing conditions, for instance, a device being communicatively coupled to a network or in response to determination of characteristics of a device) control access of various entities or micro-segment various entities, as described herein.

The enforcement points may be one or more network devices (e.g., firewalls, routers, switches, virtual switch, hypervisor, SDN (Software-Defined Network) controller, virtual firewall, etc.) that are able to enforce access or other rules, ACLs (Access Control Lists), or the like to control (e.g., allow or deny) communication and network traffic (e.g., including dropping packets) between the device and one or more other entities communicatively coupled to a network. Access rules may control whether a device can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network.

FIG. 1 depicts an illustrative communication network 100, in accordance with some embodiments of the present disclosure. The communication network 100 includes a network monitor entity 102, a network device 104, an aggregation device 106, a system 150, devices 120 and 130, and network coupled devices 122A-B. The devices 120 and 130 and network coupled devices 122A-B may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor entity 102, devices 120 and 130, and network coupled devices 122A-B. Network device 104 may be one or more network switches, access points, routers, firewalls, hubs, etc.

Network monitor entity 102 may be operable for a variety of tasks including receiving, from a cloud-based security system, information about a device that is coupled to a public network and decoupled from a private network; detecting risky activity associated with the device based on the information; and sending instructions to a remote agent executing on the device to perform one or more security measures that protect a resource of the device. In some embodiments, network monitor entity 102 can use local resources (e.g., processing, memory, data resources, or other resources), cloud resources, or a combination thereof for such an operation. In various embodiments, various libraries or an application programming interface (API) may be used to perform the operations of the network monitor entity 102.

Network monitor entity 102 can determine one or more enforcement points where the device is communicatively coupled to the network and thereby determine the one or more enforcement points closest to the device. For example, network monitor entity 102 may access information on a switch (e.g., a switch cache) to determine a port (e.g., physical port, wireless port, or virtual port) where a device with a particular IP address or MAC address or other identifier is communicatively coupled. Network monitor entity 102 may also access information from a wireless access point where the device is communicatively coupled. In some embodiments, network monitor entity 102 may poll information from a cloud service to determine where a device is communicatively coupled to a network. In various embodiments, network monitor entity 102 access syslog or SNMP information from a device itself to determine where a device is communicatively coupled to a network (e.g., without accessing information from a network device or enforcement point). Network monitor entity 102 supports applying access policies in situations where a device is communicatively coupled to a network with more than one connection (e.g., a wired connection and a wireless connection).

Based on the enforcement point, network monitor entity 102 may determine the one or more access rules to be assigned to the one or more enforcement points based on an access policy. In some embodiments, based on information about the one or more enforcement points closest to the device, network monitor entity 102 translates the access policy into one or more commands that will be used to configure the access rules on the one or more enforcement points. The closest enforcement point to a device can be enforcement point where the device is communicatively coupled. The enforcement point may be network device or network infrastructure device closest in proximity (e.g., physical proximity) to the device. The enforcement point includes the port where the device is communitive coupled to the network, and communication to and from the device is sent first through that port. In some embodiments, the port of the enforcement point is the last point of communication within network infrastructure before communication is sent to the device. In various embodiments, the closest enforcement point is where communication from the device is initially sent when communications are sent from the device (e.g., prior to communications with the network backbone or Internet backbone). For example, the closest enforcement to a device coupled to a switch is the switch. As another example, the closest enforcement point to a device wirelessly communicatively coupled to a wireless access point is the wireless access point. In various embodiments, network monitor entity 102 may access the current configuration of the one or more enforcement points to determine the access rules (e.g., ACLs) that are to be applied to the one or more enforcement points, for example. In some embodiments, a device is communicatively coupled to a wireless controller via a wireless access point and the wireless controller or a switch is the closest enforcement point (e.g., based on the wireless controller or the switch being able to apply access rules, for instance ACLs, to communications of the device, for instance, in the case where the wireless access point is not able to or does not have the functionality to apply access rules). In various embodiments, a device is communicatively coupled to a layer 3 switch via a layer 2 switch and the layer 3 switch is the closest enforcement point (e.g., based on the layer 3 switch being able to apply access rules, for instance ACLs, to communications of the device, for instance, in the case where the layer 2 switch is not able to or does not have the functionality to apply access rules).

Network monitor entity 102 may then apply or assign the access rules to the one or more enforcement points closest to the device. Network monitor entity 102 may communicate the access rules via application programming interfaces (APIs), command line interface (CLI) commands, Web interface, simple network management protocol (SNMP) interface, etc. In some embodiments, network monitor entity 102 may verify that the one or more enforcement points have been properly or correctly configured based on the access rules.

Figure 2:
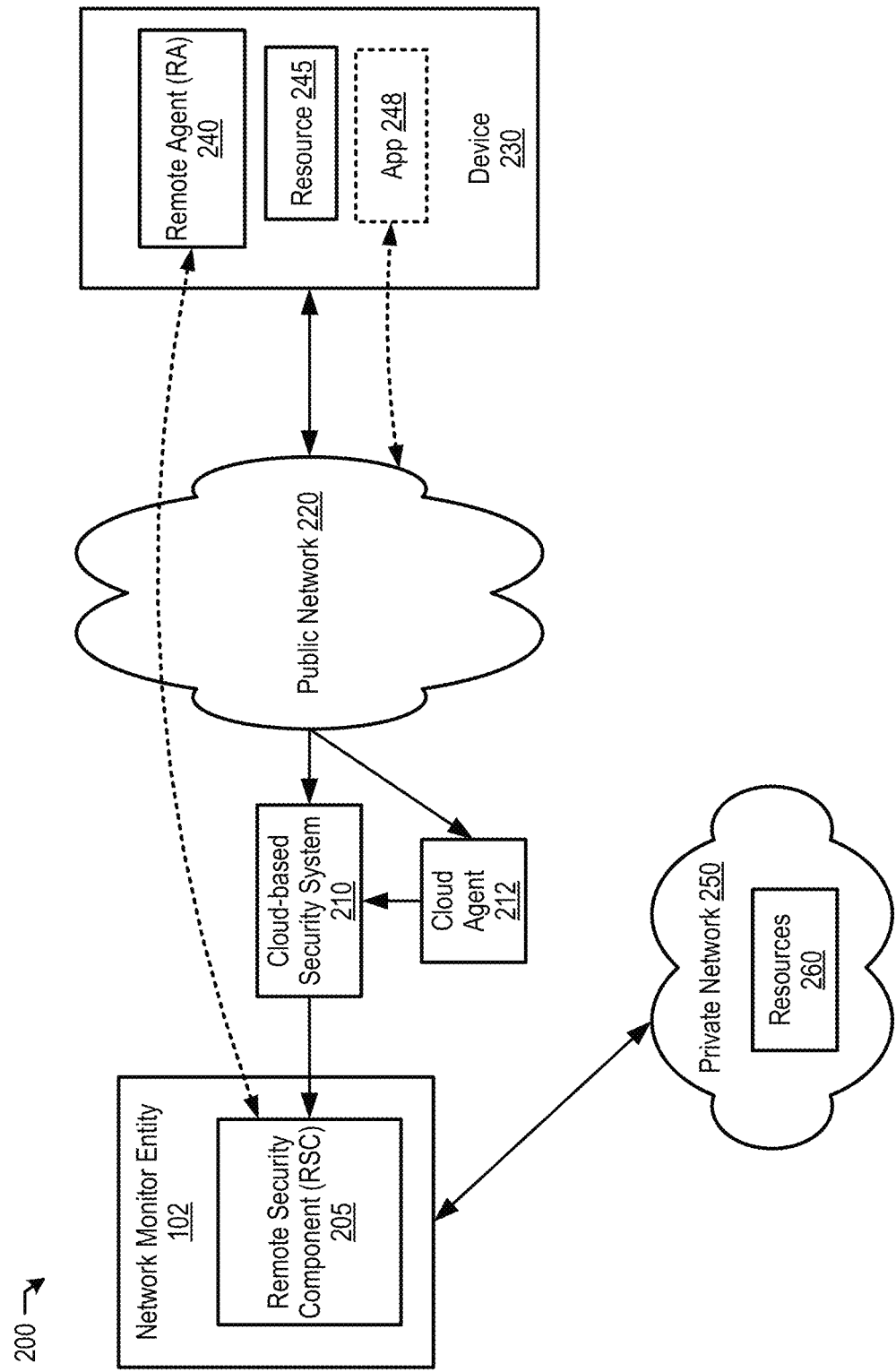
FIG. 2 is a block diagram illustrating an example of a computer network with a remote security component, according to some embodiments of the present disclosure.

Network monitor entity 102 may provide an interface (e.g., a graphical user interface (GUI)) for controlling private network access of a remote device and applying a security policy of the remote device based on data from a remote agent and a cloud-based security system, such as remote agent 240 and cloud-based security system 210 shown in FIG. 2. Network monitor entity 102 may. Network monitor entity 102 may further monitor network traffic over time to reclassify entities as new entities join the network, entities rejoin the network, and new models are made available.

Network monitor entity 102 may further perform a variety of operations including identification, classification, and taking one or more remediation actions (e.g., changing network access of a device, changing the virtual local area network (VLAN), sending an email, sending a short message service (SMS) message, disconnecting a device from a corporate network, disconnecting a device from a VPN, etc.).

Network monitor entity 102 may also parse network traffic. For example, the network monitor entity 102 may parse (e.g., read, analyze, access, etc.) different protocol fields of the network traffic (e.g., packets, messages, frames, etc.). The network monitor entity 102 may provide the field values of the protocol fields (e.g., values of certain portions of network packets, messages, frames, etc.) to one or more different processing engines (e.g., rule engines, machine learning models, etc.) that may request the protocol fields, as discussed in more detail below. The network monitor entity 102 may include a parser and one or more processing engines, for example.

An enforcement point may be a router, firewall, switch, hypervisor, software-defined networking (SDN) controller, virtual firewall, or other network device or infrastructure that may have an ACL like or rule like policy or functionality to apply based on the port where a device is communicatively coupled thereto. Enforcements points may also be a next generation firewall (NGFW) and cloud infrastructure. A NGFW can be updated with an ACL like policy regarding a device accessing the Internet. Cloud infrastructure (e.g., Amazon web services (AWS) security groups) can be updated to drop packets from the IP of the device that have a destination outside the cloud. Embodiments are operable to configure enforcement points at the edge of a network where a device is communicatively coupled thereto thereby controlling access of the device on a customized basis (e.g., customized or tailored for the device).

In some embodiments, if the categorization or characteristics functionality is being updated (e.g., which could result in a change in one or more access rules that are assigned to an enforcement point closest a device and thus impact the enforcement of an access policy by the enforcement points), notifications may be sent (e.g., via email or other methods for example) or presented to a user (e.g., via a graphical user interface (GUI)) to indicate that the categorization or characteristics of one or more entities is changing and should be confirmed before one or more enforcement points are updated based on the changed categorization or characteristics. After confirmation, the access rules may be changed.

Network monitor entity 102 may be a computing system, network device (e.g., router, firewall, an access point), network access control (NAC) device, intrusion prevention system (IPS), intrusion detection system (IDS), deception device, cloud-based device, virtual machine based system, etc. Network monitor entity 102 may be communicatively coupled to the network device 104 in such a way as to receive network traffic flowing through the network device 104 (e.g., port mirroring, sniffing, acting as a proxy, passive monitoring, etc.). In some embodiments, network monitor entity 102 may include one or more of the aforementioned devices. In various embodiments, network monitor entity 102 may further support high availability and disaster recovery (e.g., via one or more redundant devices).

In some embodiments, network monitor entity 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor entity 102 may be based on a combination of one or more pieces of information including traffic analysis, information from external or remote systems (e.g., system 150), communication (e.g., querying) with an aggregation device (e.g., aggregation device 106), and querying the device itself (e.g., via an application programming interface (API), command line interface (CLI), web interface, simple network management protocol (SNMP), etc.). Network monitor entity 102 may be operable to use one or more APIs to communicate with aggregation device 106, device 120, device 130, or system 150. Network monitor entity 102 may monitor for or scan for entities that are communicatively coupled to a network via a NAT device (e.g., firewall, router, etc.) dynamically, periodically, or a combination thereof.

Information from one or more external or third party systems (e.g., system 150) may further be used for determining one or more tags or characteristics for a device. For example, a vulnerability assessment (VA) system may be queried to verify or check if a device is in compliance and provide that information to network monitor entity 102. External or third party systems may also be used to perform a scan or a check on a device to determine a software version.

Device 130 can include agent 140. The agent 140 may be a hardware component, software component, or some combination thereof configured to gather information associated with device 130 and send that information to network monitor entity 102. The information can include the operating system, version, patch level, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor entity 102 may utilize agent information from the agent 140. While network monitor entity 102 may be able to receive information from agent 140, installation or execution of agent 140 on many entities may not be possible, e.g., IoT or smart devices.

System 150 may be one or more external, remote, or third party systems (e.g., separate) from network monitor entity 102 and may have information about devices 120 and 130 and network coupled devices 122A-B. System 150 may include a vulnerability assessment (VA) system, a threat detection (TD) system, endpoint management system, a mobile device management (MDM) system, a firewall (FW) system, a switch system, an access point system, etc. Network monitor entity 102 may be configured to communicate with system 150 to obtain information about devices 120 and 130 and network coupled devices 122A-B on a periodic basis, for example. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by network monitor entity 102.

The advanced threat detection (ATD) or threat detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by network monitor entity 102.

Endpoint management systems can include anti-virus systems (e.g., servers, cloud-based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor entity 102.

The firewall (FW) system may be configured to monitor and control incoming and outgoing network traffic (e.g., based on security rules). The FW system may provide information about a device being monitored including attempts to violate security rules (e.g., unpermitted account access across segments) and network traffic of the device being monitored.

The switch or access point (AP) system may be any of a variety of network devices (e.g., network device 104 or aggregation device 106) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to network monitor entity 102 which may be used to monitor entities and control network access of one or more entities. The switch or AP system may have one or more interfaces for communicating with IoT or smart devices or other devices (e.g., ZigBee', Bluetooth™, etc.), for example. The VA system, ATD system, and FW system may thus be accessed to get vulnerabilities, threats, and user information of a device being monitored in real-time which can then be used to determine a risk level of the device.

Aggregation device 106 may be configured to communicate with network coupled devices 122A-B and provide network access to network coupled devices 122A-B. Aggregation device 106 may further be configured to provide information (e.g., operating system, device software information, device software versions, device names, application present, running, or both, vulnerabilities, patch level, etc.) to network monitor entity 102 about the network coupled devices 122A-B. Aggregation device 106 may be a wireless access point that is configured to communicate with a wide variety of devices through multiple technology standards or protocols including, but not limited to, Bluetooth™, ZigBee™, Radio-frequency identification (RFID), Light Fidelity (Li-Fi), Z-Wave, Thread, Long Term Evolution (LTE), HaLow, HomePlug, Multimedia over Coax Alliance (MoCA), and Ethernet. For example, aggregation device 106 may be coupled to the network device 104 via an Ethernet connection and coupled to network coupled devices 122A-B via a wireless connection. Aggregation device 106 may be configured to communicate with network coupled devices 122A-B using a standard protocol with proprietary extensions or modifications.

Aggregation device 106 may further provide log information of activity and properties of network coupled devices 122A-B to network monitor entity 102. It is appreciated that log information may be particularly reliable for stable network environments (e.g., where the types of devices on the network do not change often). The log information may include information of updates of software of network coupled devices 122A-B.

FIG. 2 is a block diagram illustrating an example of a computer network with a remote security component, according to some embodiments of the present disclosure. Network monitor entity 102 monitors devices on private network 250 and protects resources 260 from being compromised. In some embodiments, network monitor entity 102 resides within private network 250. Network monitor entity 102 also includes remote security component (RSC) 205, which interfaces with cloud-based security system 210 to detect malicious activity on devices that are not coupled to private network 250, such as device 230. For example, device 230 may be a corporate owned device that stores sensitive data (resource 245) and is coupled to the Internet (public network 220) via an airplane's on-board Wi-Fi system. In some embodiments, system 200 includes cloud agent 212, which tracks system calls, writes to storage activity, etc., and uploads the tracking information to cloud-based security system 210.

In some embodiments, device 230 includes remote agent 240 that establishes a connection with remote security component 205, such as when device 230 connects to public network 220. Device 230 connects to public network 220 and sends/receives network traffic to/from public network 220. While coupled, malicious activity associated with a vulnerability or other security risk could be detected or logged by cloud-based security system 210 via cloud agent NNN. For example, a malicious application 248 could (unknowingly) be installed on device 230 and allow access to resource 245 and downloading it through public network 220. In another example, the source of malicious activity may be in public network 220 and is attempting to access resource 245 through the network connection between public network 220 and device 230.

Cloud-based security system 210 monitors the network traffic between public network 220 and device 230, and provides the information to remote security component 205. In some embodiments, remote security component 205 may access or query cloud-based security system 210 to receive information (e.g., communications, device properties, activity, for instance program calls or write to storage, etc.) about device 230. When remote security component 205 evaluates the information from cloud-based security system 210 and determines that malicious activity may be occurring at device 230, remote security component 205 sends instructions (security measure instructions) to remote agent 140 to perform one or more security measures. For example, one security measure may be to quarantine/uninstall application 248 and protect resource 245 from being compromised. Another protective security measure may be to disconnect device 230 from public network 220 or a VPN connection to private network 250. Yet another security measure may be to prohibit device 230 from connecting to private network 250 (e.g., via block a VPN connection) until the security threat is resolved. Remote security component 205 may perform other security actions as described herein.

In some embodiments, remote agent 240 monitors local activity on device 230 and sends information about the local activity to remote security component 205. Remote security component 205 evaluates the local activity information associated with device 230 and determines whether malicious activity is occurring. When remote security component 205 determines that malicious activity is occurring, remote security component 205 sends instructions to remote agent 240 to perform one or more protective security measures. In some embodiments, remote agent 240 informs remote security component 205 of applications executing on device 230. When remote security component 205 detects a malicious application, such as one on a blacklist, remote security component 205 sends one or more instructions or signals associated with one or more protective security measures to remote agent 240 to perform on device 230 (see FIG. 4 and corresponding text for further details).

Figure 3:
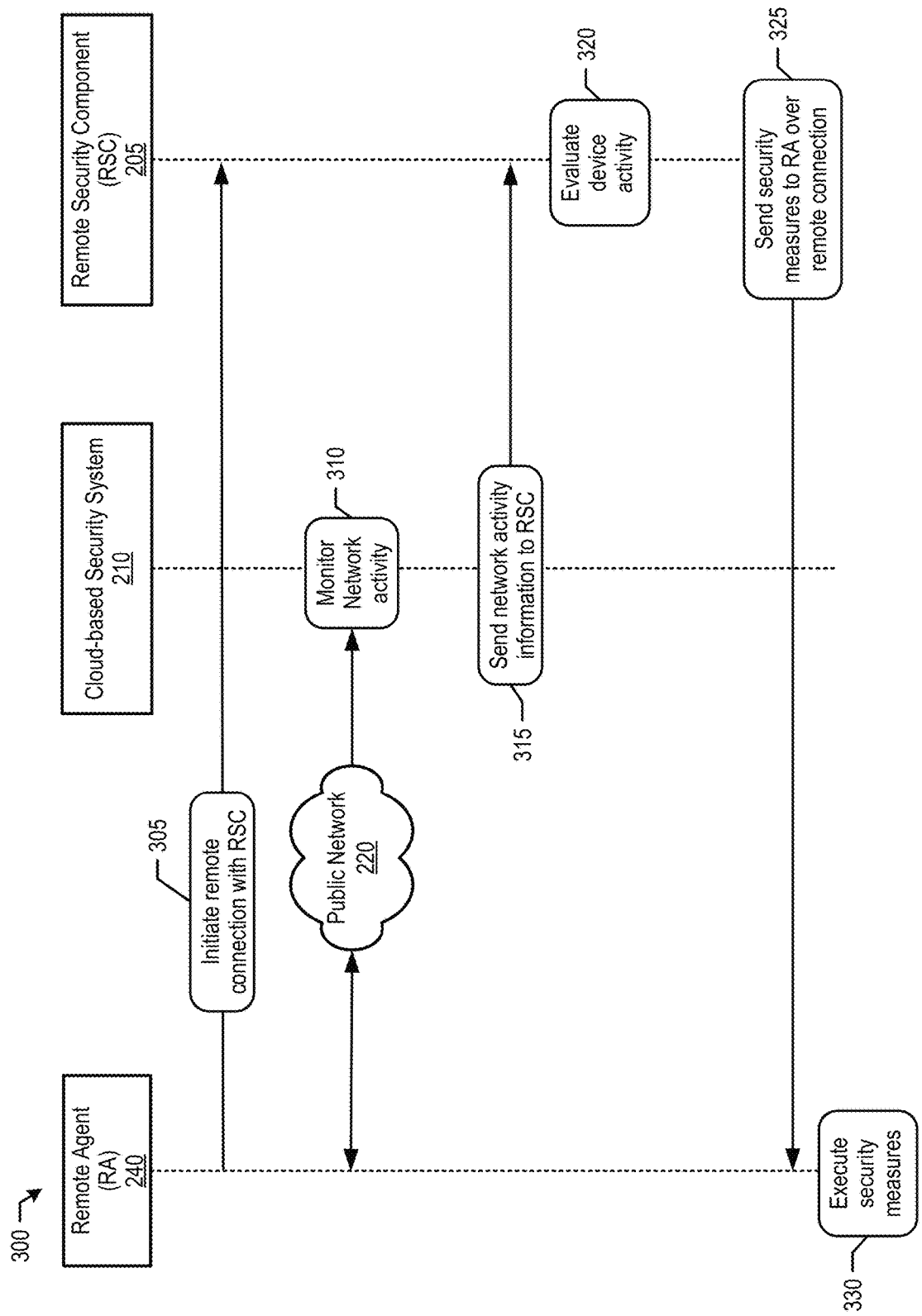
FIG. 3 is a diagram illustrating an example of a remote security component receiving network activity information from a cloud-based security system and instructing a remote agent to perform security measures on a device, according to some embodiments of the present disclosure.

FIG. 3 is a diagram illustrating an example of a remote security component receiving network activity information from a cloud-based security system and instructing a remote agent to perform one or more security measures on a device, according to some embodiments of the present disclosure.

Diagram 300 includes remote agent 240, cloud-based security system 210, and remote security component 205. When device 230 connects to public network 220, in some embodiments, remote agent 240 initiates a remote connection with remote security component 205 (305). As device 230 sends and receives network traffic to and from public network 220, cloud-based security system 210 monitors the network activity and other activity (e.g., via cloud agent 212) associated with device 230 (310). At times, cloud-based security system 210 sends the activity information to the remote security component 205 (315). In some embodiments, cloud-based security system 210 sends the activity information in real-time. In some embodiments, cloud-based security system 210 receives the activity information at timed intervals, such as every 15 minutes. In some embodiments, cloud-based security system 210 receives security parameters from remote security component 205, in which cloud-based security system 210 evaluates with the network activity and, when cloud-based security system 210 detects that the network activity corresponds with the security parameters, cloud-based security system 210 sends the activity information (e.g., network activity or communications of device 230, local activity on device 230, etc.) to remote security component 205.

Remote security component 205 evaluates the activity information (320), and, when remote security component 205 detects malicious activity (e.g., associated with a vulnerability), remote security component 205 sends instructions over to remote agent 240 to perform one or more security measures accordingly (325). In turn, remote agent 240 executes the security measures on device 230, such as the one or more security measures discussed herein.

Figure 4:
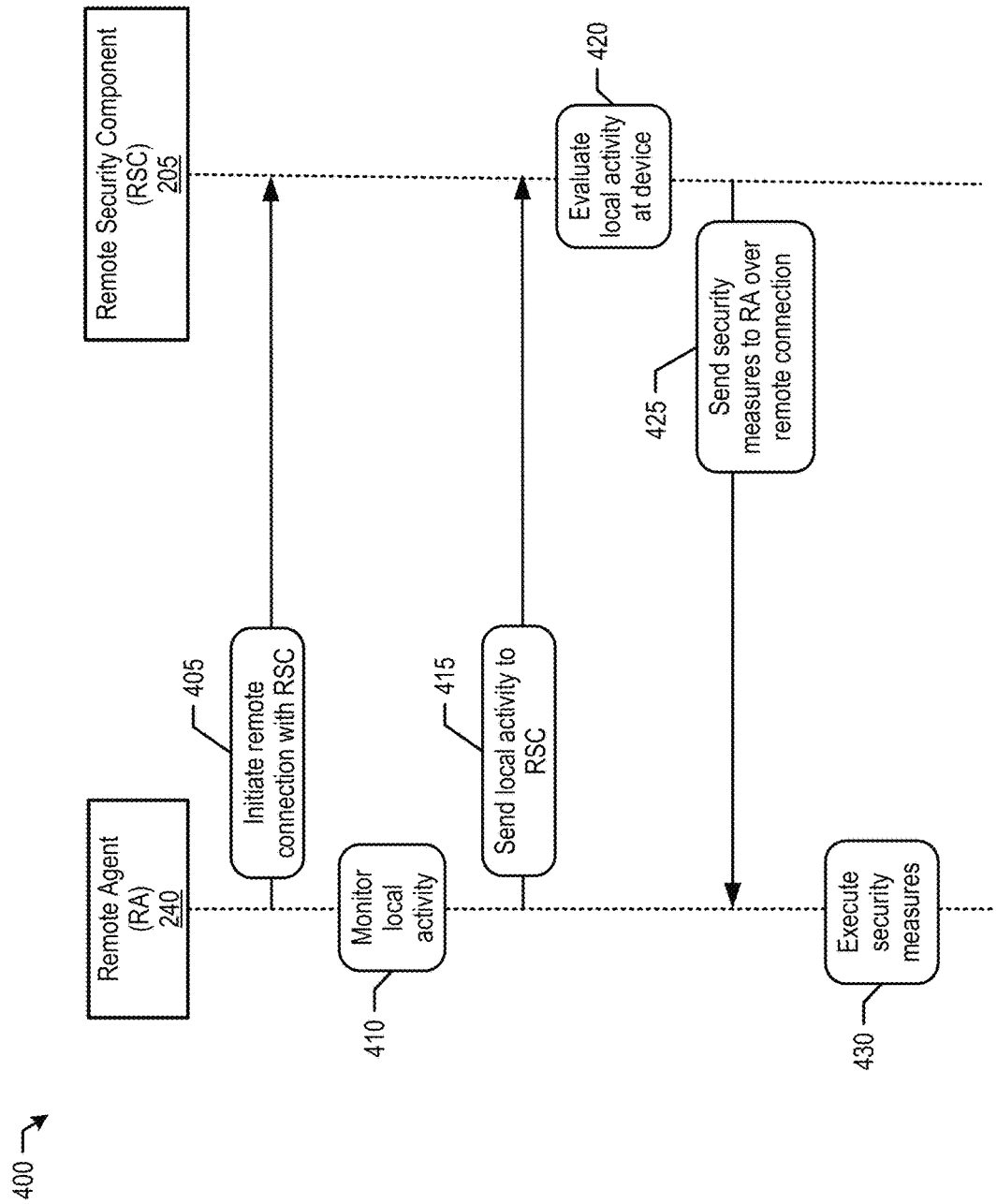
FIG. 4 is a diagram illustrating an example of a remote security component receiving local activity information from a remote agent and communicating with the remote agent to perform security measures on a device, according to some embodiments of the present disclosure.

FIG. 4 is a diagram illustrating an example of a remote security component receiving local activity information from a remote agent and communicating with the remote agent to perform security measures on a device, according to some embodiments of the present disclosure. In some embodiments, remote security component 205 receives local activity information from remote agent 240 through an established remote connection. Diagram 400 shows the interaction between remote agent 240 and remote security component 205 to provide and evaluate the local activity information.

Remote agent 240 initiates a remote connection with remote security component 205 (405), such as when device 230 connects to public network 220, and monitors local activity on device 230 (410), such as API calls, writes to storage, detecting of Indicators of Compromise (IOC), etc. For example, remote agent 240 may monitor applications loaded onto device 230, monitor access to resource 245, monitor network settings, or a combination thereof to detect parameter changes (e.g., port settings). Remote agent 240 then sends the local activity information to remote security component 205 (415). Remote agent 240 may send the local activity information at timed intervals, when certain thresholds are met, or a combination thereof, such as when certain number of times that a particular application accesses resource 245.

Remote security component 205 evaluates the local activity information to determine whether malicious or risky activity may be occurring on device 230 (420). When malicious or risky activity is detected, remote security component 205 sends instructions to remote agent 240 to perform one or more security measures on device 230. In turn, remote agent 240 executes the one or more security measures on device 230, such as uninstalling a malicious application, disconnecting device 230 from public network 220, or a combination thereof. In some embodiments, remote agent 240 sends local activity information to remote security component concurrently with cloud-based security system 210 sending network activity to remote security component 205.

Figure 5:
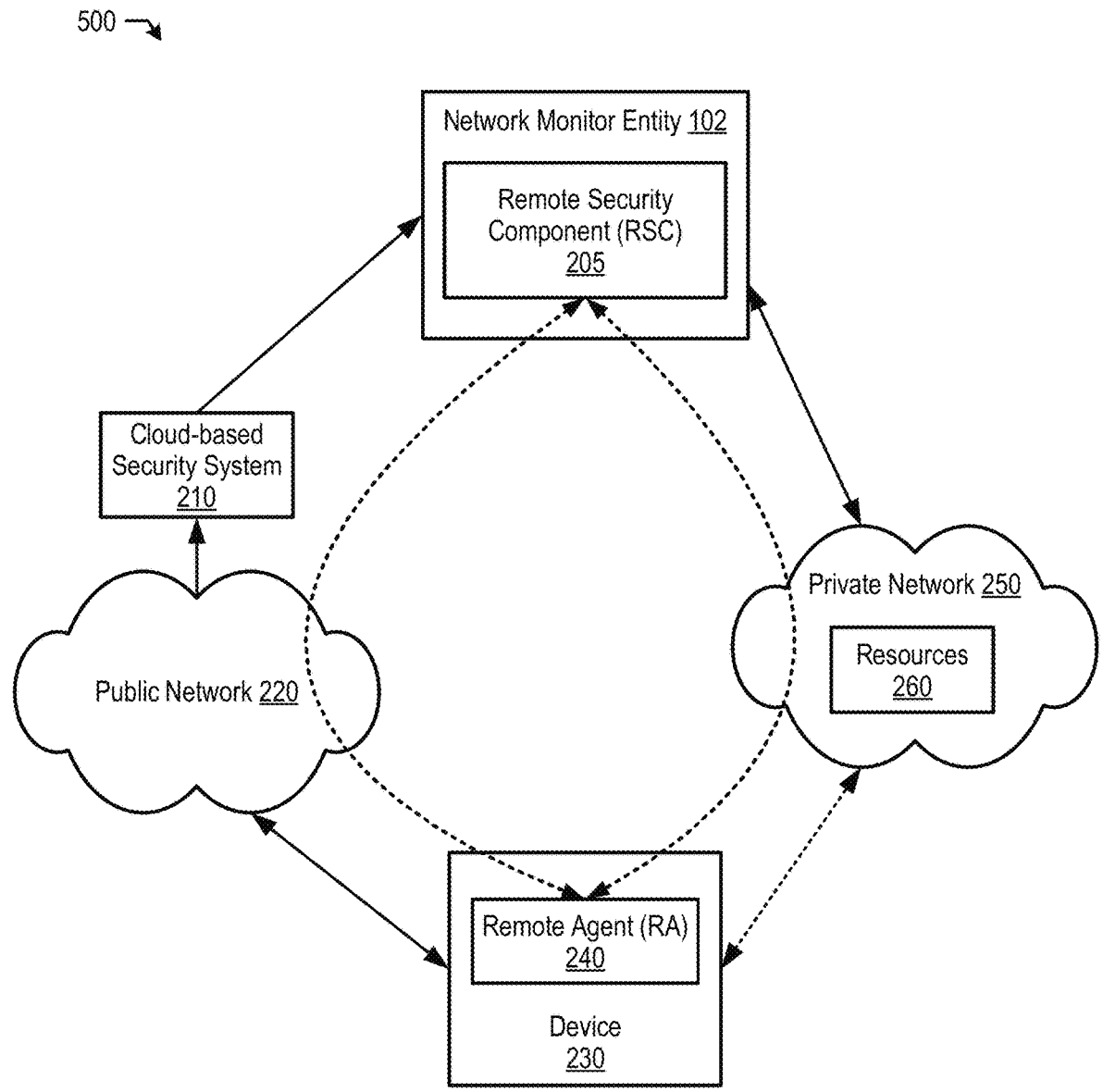
FIG. 5 is a block diagram illustrating an example of a remote security component communicating with a remote agent when a device connects to a private network, according to some embodiments of the present disclosure.

FIG. 5 is a block diagram illustrating an example of a remote security component communicating with a remote agent when a device connects to a private network, according to some embodiments of the present disclosure. When device 230 connects, or attempts to connect, to private network 250, remote security component 205 and remote agent 240 establish a remote connection through either public network 220 or private network 250 to ensure that device 230 does not compromise resources 260 on private network 250.

In some embodiments, device 230 is communicatively coupled to public network 220, in which case cloud-based security system 210 monitors device's 230 activity (e.g., network activity, local activity, etc.) accordingly and provides information about the activity to remote security component 205. In some embodiments, as discussed herein, when remote security component 205 detects malicious or risky activity, remote security component 205 send instructions to remote agent 240 to perform one or more security measures, such as disconnecting from public network 220, prohibiting device 230 from connecting to private network 250, or a combination thereof.

When device 230 attempts to connect to private network 250, remote security component 205 may evaluate historical information obtained by cloud-based security system 210 to determine whether to allow device 230 to connect. For example, the historical information may indicate that a malicious application was installed on device 230 and, in this example, remote security component 205 requires verification from remote agent 240 that the malicious application has been uninstalled prior to device 230 connecting to private network 250.

In some embodiments, when remote security component 205 detects malicious or risky activity between device 230 and private network 250, remote security component 205 may protect resource 260 from vulnerability by device 230, and may also instruct remote agent 240 to disconnect device 230 from private network 250. In some embodiments, remote security component 205 may instruct remote agent 240 to disable device 230 altogether until device 230 can be properly evaluated, such as being patched, updated, or a combination thereof.

Figure 6:
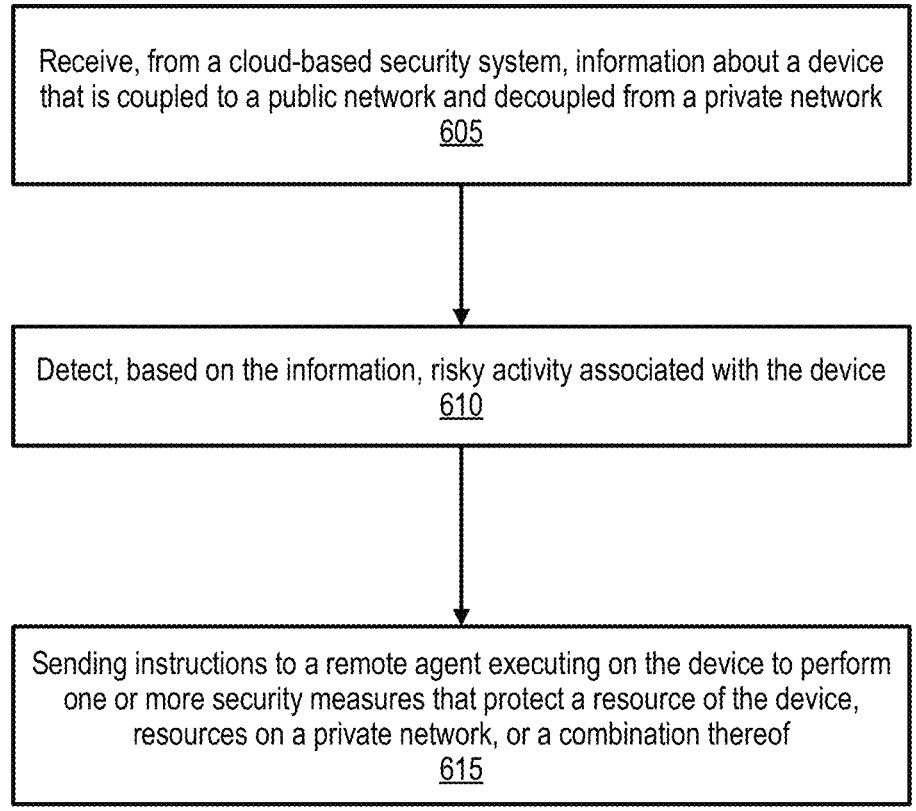
FIG. 6 is a flow diagram illustrating an example of communicating with a remote agent to protect resources of a remote device, resources on a private network, or a combination thereof, according to some embodiments of the present disclosure.

FIG. 6 is a flow diagram illustrating an example of communicating with a remote agent to protect resources of a remote device, resources on a private network, or a combination thereof, according to some embodiments of the present disclosure. Additional, fewer, or different operations may be performed in the method depending on the particular arrangement. In some embodiments, some or all operations of method 600 may be performed by one or more processors executing on one or more computing devices, systems, or servers (e.g., remote/networked servers or local servers). Each operation may be re-ordered, added, removed, or repeated. In some embodiments, method 600 may be performed by processing logic including hardware (e.g., circuitry, dedicated logic, programmable logic, a processor, a processing device, a central processing unit (CPU), a system-on-chip (SoC), etc.), software (e.g., instructions running/executing on a processor or processing device), firmware (e.g., microcode), or a combination thereof.

In some embodiments, the method 600 may include operation 605 of receiving or accessing, from a cloud-based security system or third party system, information about a device that is coupled to a public network and decoupled from a private network. The information is generated based on network traffic from the device over the public network or local activity of device 230. For example, remote security component 205 receives network activity associated with device 230 from cloud-based security system 210.

In some embodiments, the method 600 may include operation 610 of detecting, based on the information, malicious or risky activity associated with a vulnerability of the device. For example, remote security component 205 may determine, based on the network activity, that a known Trojan application was installed onto device 230.

In some embodiments, the method 600 may include operation 615 of sending instructions to a remote agent executing on the device (e.g., device 230) to perform one or more security measures that protect a resource of the device from the vulnerability or compromise. For example, remote security component 205 may send instructions to remote agent 240 to quarantine application 248, uninstall application 248, disconnect from public network 220, disconnect from a VPN, or any combination thereof. In some embodiment, the method 600 may send instructions to the remote agent to perform one or more security measures that protect a resource on a private network, such as prohibiting the device from connecting to the private network (see FIG. 5 and corresponding text for further details).

Figure 7:
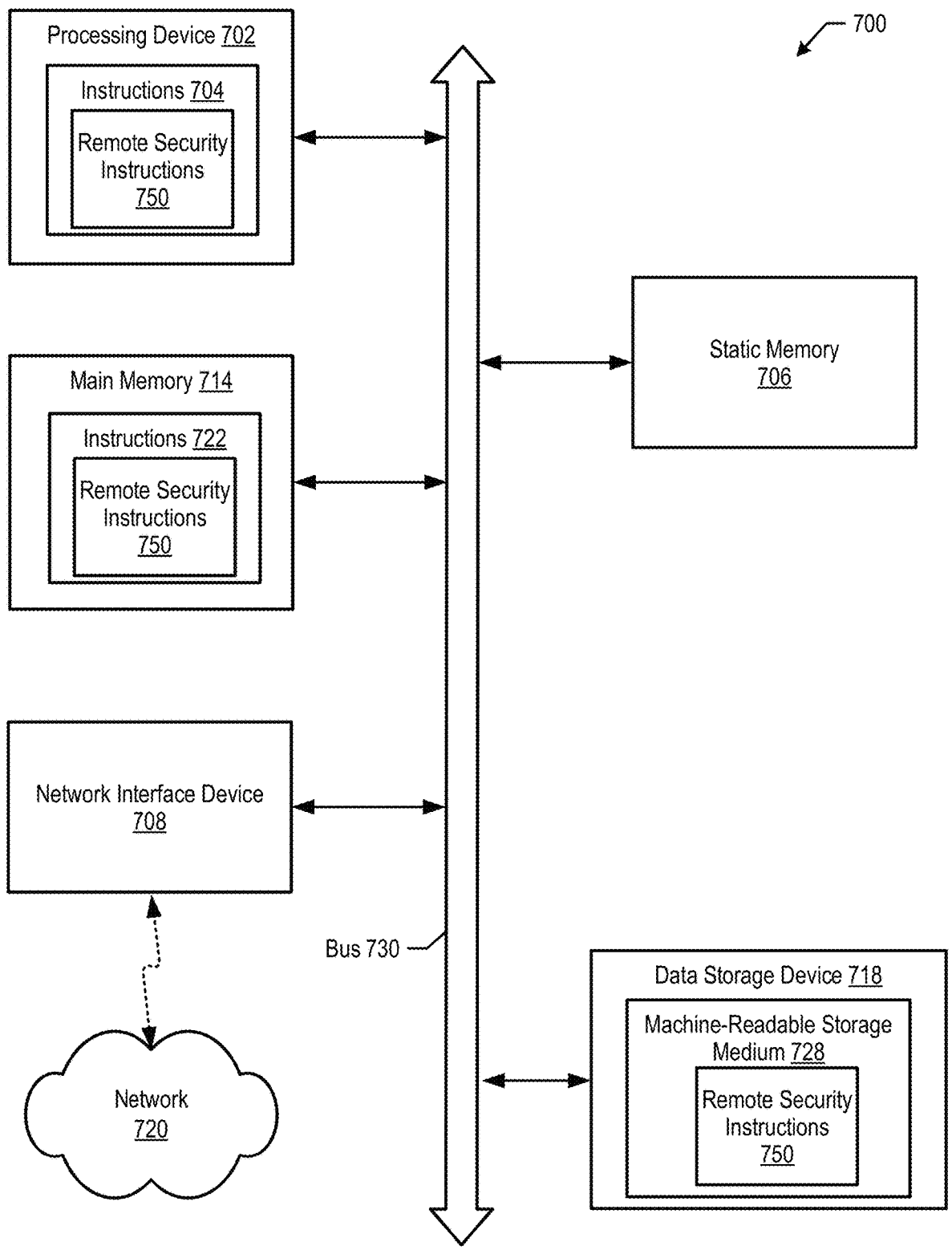
FIG. 7 is a block diagram illustrating an example computer system, in accordance with some embodiments of the present disclosure.

FIG. 7 is a block diagram illustrating an example computer system 700, in accordance with some embodiments of the present disclosure. This can be understood as a diagrammatic representation of a machine in the example form of a computer system within which a set of instructions, for causing the machine to perform any one or more of the methodologies discussed herein, may be executed. In alternative embodiments, the machine may be coupled (e.g., networked) to other machines in a local area network (LAN), an intranet, an extranet, or the Internet.

The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 700 may be representative of a server, such as network monitor entity 102, that runs a remote security instructions 750 (e.g., remote security component 205) to protect a network from a device, for example.

The exemplary computer system 700 includes a processing device 702, a main memory 714 (e.g., read-only memory (ROM), flash memory, dynamic random access memory (DRAM)), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection or coupling between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 704 which may include remote security instructions 750, for performing the operations and blocks discussed herein.

The data storage device 718 may include a machine-readable storage medium 728, on which is stored one or more set of instructions 722 (e.g., software) embodying any one or more of the methodologies of operations described herein, including instructions to cause the processing device 702 to execute remote security instructions 750. The instructions 722 may also reside, completely or at least partially, within the main memory 714 or within the processing device 702 during execution thereof by the computer system 700; the main memory 714 and the processing device 702 also constituting machine-readable storage media. The instructions 722 may further be transmitted or received over a network 720 via the network interface device 708.

The machine-readable storage medium 728 may also be used to store instructions to perform a method for determining and mitigating security risk of devices on a network, based on the data they hold, as described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions.

A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

When an action, function, operation, etc., is described herein as being performed automatically, this may indicate that the action, function, operation, etc., may be performed without requiring human or user input, invocation, or interaction.

The above description of illustrated implementations of the present disclosure, including what is described in the Abstract, is not intended to be exhaustive or to limit the present disclosure to the precise forms disclosed. While specific implementations of, and examples for, the present disclosure are described herein for illustrative purposes, various equivalent modifications are possible within the scope of the present disclosure, as those skilled in the relevant art will recognize.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

What is claimed is:

1. A method, comprising:
receiving, from a cloud-based security system, information about a device that is coupled to a public network and decoupled from a private network, wherein the information is generated based on network traffic from the device over the public network;
detecting, based on the information, risky activity associated with the device;
determining that the information indicates an application installed on the device is performing the risky activity on the device; and
sending, by a processing device, instructions to a remote agent executing on the device to perform one or more security measures that protect a resource of the device, wherein the instructions instruct the remote agent to prohibit the application installed on the device from accessing the resource on the device.

2. The method of claim 1, further comprising:
establishing a remote connection with the remote agent over the public network; and
transmitting the instructions over the remote connection to the remote agent.

3. The method of claim 1, wherein:
the information is generated based on network traffic from the device over a public network connection between the public network and the application; and
the instructions instruct to the remote agent to disconnect the device from the public network connection.

4. The method of claim 2, wherein the instructions instruct the remote agent to prohibit the device from attempting to connect to the private network.

5. The method of claim 2, further comprising:
receiving local activity information from the remote agent over the remote connection;
determining that the local activity information indicates a malicious application executing on the device; and
wherein the instructions instruct the remote agent to prohibit the malicious application from accessing the resource.

6. The method of claim 1, wherein the resource is associated with the private network and the one or more security measures are based on a set of policies that protect the private network from the risky activity.

7. A system comprising:
a memory; and
a processing device, operatively coupled to the memory, to:
receive, from a cloud-based security system, information about a device that is coupled to a public network and decoupled from a private network;
detect, based on the information, risky activity associated with the device;
determine that the information indicates an application installed on the device is performing the risky activity on the device; and
send instructions to a remote agent executing on the device to perform one or more security measures that protect a resource of the device, wherein the instructions instruct the remote agent to prohibit the application installed on the device from accessing the resource on the device.

8. The system of claim 7, wherein the processing device is to:
establish a remote connection with the remote agent over the public network; and
transmit the instructions over the remote connection to the remote agent.

9. The system of claim 7, wherein:
the information is generated based on network traffic from the device over a public network connection between the public network and the application; and
the instructions instruct to the remote agent to disconnect the device from the public network connection.

10. The system of claim 8, wherein the instructions instruct the remote agent to prohibit the device from attempting to connect to the private network.

11. The system of claim 8, wherein the processing device is to:
receive local activity information from the remote agent over the remote connection;
determine that the local activity information indicates a malicious application executing on the device; and
wherein the instructions instruct the remote agent to prohibit the malicious application from accessing the resource.

12. The system of claim 7, wherein the resource is associated with the private network and the one or more security measures are based on a set of policies that protect the private network from the risky activity.

13. A non-transitory computer readable medium having instructions encoded thereon that, when executed by a processing device, cause the processing device to:
receive, from a cloud-based security system, information about a device that is coupled to a public network and decoupled from a private network;
detect, based on the information, risky activity associated with the device;
determine that the information indicates an application installed on the device is performing the risky activity on the device; and
send, by the processing device, security measure instructions to a remote agent executing on the device to perform one or more security measures that protect a resource of the device, wherein the instructions instruct the remote agent to prohibit the application installed on the device from accessing the resource on the device.

14. The non-transitory computer readable medium of claim 13, wherein the processing device is to:
establish a remote connection with the remote agent over the public network; and
transmit the security measure instructions over the remote connection to the remote agent.

15. The non-transitory computer readable medium of claim 13, wherein:
the information is generated based on network traffic from the device over a public network connection between the public network and the application; and
the security measure instructions instruct to the remote agent to disconnect the device from the public network connection.

16. The non-transitory computer readable medium of claim 14, wherein the security measure instructions instruct the remote agent to prohibit the device from attempting to connect to the private network.

17. The non-transitory computer readable medium of claim 14, wherein the processing device is to:
receive local activity information from the remote agent over the remote connection;
determine that the local activity information indicates a malicious application executing on the device; and
wherein the security measure instructions instruct the remote agent to prohibit the malicious application from accessing the resource.

* * * * *